H. G. LEVY.
LOCK.
APPLICATION FILED AUG. 15, 1921.
1,415,662.
Patented May 9, 1922.
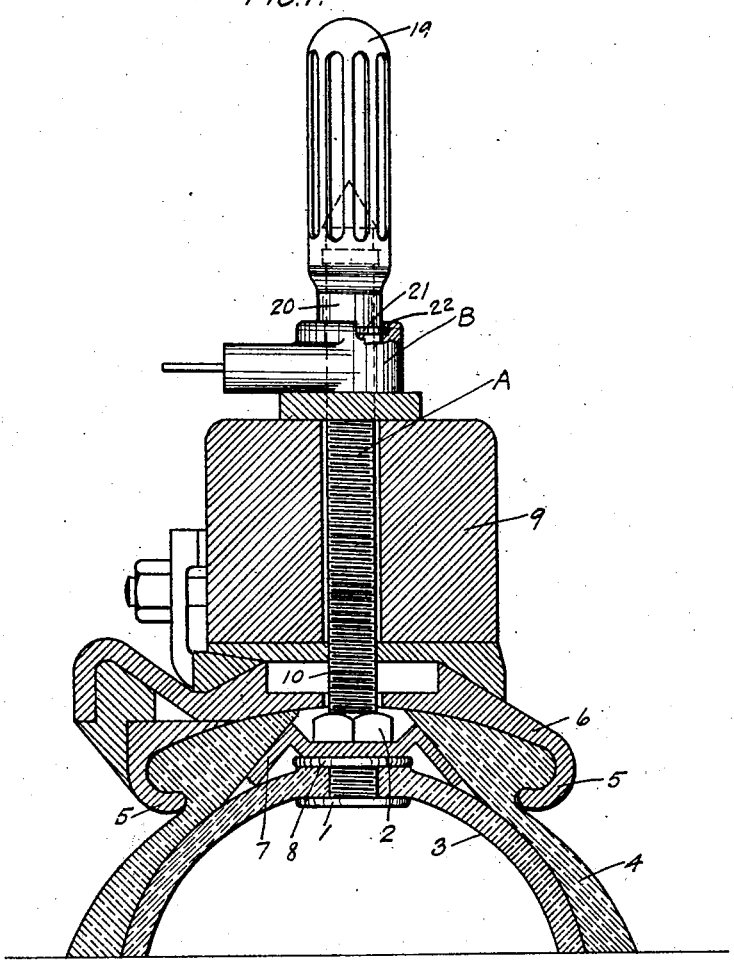
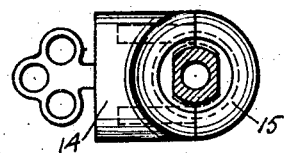
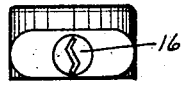
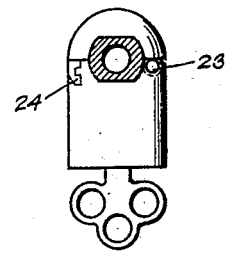
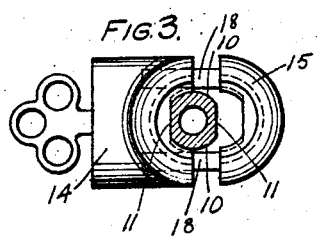
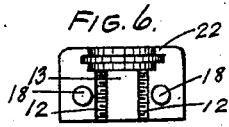
INVENTOR
HENRI G. LEVY
BY John S. Powers.
ATTORNEY

UNITED STATES PATENT OFFICE.

HENRI G. LEVY, OF SAN FRANCISCO, CALIFORNIA, ASSIGNOR TO ROBERT H. BUTTERS, OF ATLANTA, GEORGIA.

LOCK.

1,415,662.   Specification of Letters Patent.   Patented May 9, 1922.

Application filed August 15, 1921. Serial No. 492,501.

*To all whom it may concern:*

Be it known that I, HENRI G. LEVY, a citizen of the United States, residing at San Francisco, in the county of San Francisco and State of California, have invented certain new and useful Improvements in Locks, of which the following is a specification.

This invention relates to improvements in locks, proposing a structure of the general type of a padlock, i. e. wherein the locking block is detachable and is located externally of the object fastened.

The principal objects are to provide a lock of simple construction, which is easily and quickly applied, which will rigidly hold one or a series of objects and which will be certain and effective in operation.

With the above objects in view the invention consists generally in the combination of a co-operating stem and block wherein the block has lock mechanism incorporated therewith and comprises two parts which are relatively movable and by such movement are brought into position wherein they may be coupled by the lock mechanism and are also engaged with the stem in such manner that the block is prevented from endwise movement thereon. The invention also consists in novel details of structure and arrangement appurtenant to such combination.

The invention is shown in the accompanying drawings as applied in combination with other elements for locking a pneumatic tire to its mounting but it will be understood that the invention is of general useful application and that the particular use herein illustrated is selected merely as an example.

In said drawings:

Figure 1 is a side elevation of the lock with the tire and the parts comprising its mounting shown in cross section.

Figure 2 is a plan view of the locking block in operative position.

Figure 3 is a plan view of the locking block but with the parts thereof separated.

Figure 4 is an end elevation of the locking block.

Figures 5 and 6 are elevations showing the inner faces of the parts of the locking block.

Figure 7 is a plan view of a locking block of modified construction.

The two principal parts of the lock are the stem A and the locking block B. The stem A is mounted or adapted for turning movement about its axis and in the tire locking organization disclosed may be constituted by the usual valve stem which is secured at its inner end by means of the head 1 and nut 2 to the inner casing 3. The outer casing 4 has the usual marginal beads which are fitted in flanges 5 of the rim 6 and the stem A co-operates with said flanges and rim to hold the outer casing in position, for this purpose being provided in the usual manner with a spreader 7 located externally of the inner casing and bearing from within against the beads of the outer casing, the spreader being confined between the nut 2 and a washer 8. The rim 6 and felly 9 are provided with openings through which the stem projects and the locking block B is fitted on the projecting portion of the stem and preferably bears against the felly or other object to be secured.

The stem A and block B are formed to co-operate whereby when engaged with one another the block is held against endwise movement on the stem. As shown and preferred the stem is provided with corrugations which, in the embodiment shown, are constituted by threads 10, and with flat sides 11 forming interruptions of the threads, and the block has a central opening through which the stem projects and whose wall is provided with threads 12 to engage with the threads 10 and with flat faces 13 to bear against the flat sides 11.

According to the invention the block, having the features stated, is made in two parts, one of which has lock mechanism for co-operation with the companion part; and the two parts of the block have a relative movement which effects the complete engagement of the block with the stem and also brings the parts into a relative position wherein they may be locked together.

In the embodiment shown the locking block is made in matching half sections 14 and 15 which may be locked to one another in the manner of a padlock. The section 14 is provided with suitable lock mechanism indicated generally at 16 and has recesses 17 to receive extensions 18 of the part 15 which extensions co-operate in the usual manner of a padlock with the lock mechanism 16. The lock mechanism may be of the snap or spring type, that is to say, acting automatically when the relative movement of the parts has been completed or it may require a key for its locking operation. As shown, the threads 12 may be divided between the two parts 14 and 15, that is to say formed partly on each, the curve of the threads being completed when the parts are brought together and into the relative position required for the operation of the locking mechanism, in which case each part will be provided with one of the flat faces 13.

The locking block, constructed as above described, may, when used in a tire locking organization as shown, be incidentally used to secure the dust cap 19 and for this purpose the neck 20 of said cap may be left unthreaded and provided with a circumscribing flange 21 for engagement by means of a flange 22 formed complementally on the parts of the block.

The construction shown in Figure 7 does not differ essentially from the construction above described. According to the modification the two part locking block is merely made in conformity to another well known type of padlock, that is to say the two parts are hinged together as at 23 and one part is provided with a projecting catch 24 for co-operation with the locking mechanism carried by the companion part. In other respects the modified construction is similar to the one first described.

The operation of the particular device disclosed is as follows:

The stem is passed through an opening in the object to be secured and the two parts of the locking block are positioned at the side of such object remote from the inner end of the stem and at opposite sides of the projecting portion of the stem as shown in Figure 3. The block parts are then moved as far as possible toward one another, that is to say brought together, and such relative movement is effective to engage the block with and against endwise movement on the stem and also to bring the parts into the relative position required for the operation of the lock mechanism 16 which thereupon, if of the spring type, operates automatically, or, if otherwise constructed, is operated by a key or in any other suitable manner to lock the parts in their operative stem-engaging position. As thus locked on the stem the block cannot be removed except by the proper operation of the lock mechanism with an appropriate key. Where the block and the stem are formed to co-operate by means of corrugations and flat faces forming interruptions of such corrugations, as in the construction disclosed, the block is locked against both endwise and turning movement on the stem.

It will be understood that modifications of the construction shown but which embody the general principles of operation described may be resorted to within the scope of the appended claims.

Having fully described my invention, I claim:

1. A lock comprising in combination a stem adapted for turning movement about its axis and a block which may be fitted closely and conformably upon the stem, said block comprising two parts and lock mechanism incorporated with one part for cooperation with the other and said parts having relative movement by which they may be engaged with the stem in a manner to hold the block against endwise and turning movement on the stem and also may be brought into the relative position required for operation of said lock mechanism.

2. A lock comprising, in combination, a stem and a block which may be fitted closely and conformably upon and engaged with the stem adapted for turning movement about its axis against endwise and turning movement thereon, said block having an opening for said stem and comprising two parts and said opening being formed partly in one part and partly in the other whereby each part is fashioned to fit over said stem and lock mechanism incorporated with one part for co-operation with the other, said parts having relative movement by which they may be engaged with the stem in a manner to hold the block against endwise and turning movement on the stem and also may be brought into the relative position required for the operation of said lock mechanism.

3. A lock comprising, in combination, a stem adapted for turning movement about its axis and provided with corrugations and with flat faces interrupting the corrugations and a block having an opening for said stem and having the walls of said opening provided with corrugations and flat faces to engage the respective corrugations and flat faces of said stem, the block being thereby held against endwise and turning movement on the stem, said block comprising two parts and said opening being formed partly in one part and partly in the other whereby each part is fashioned to fit over said stem and lock mechanism incorporated with one part for co-operation with the other, said parts having relative movement by which to engage the corrugations and flat faces of the block with the corrugations and flat faces of the stem and to bring said parts in the relative position required for the operation of the lock mechanism.

In testimony whereof I affix my signature.

HENRI G. LEVY.